United States Patent
Dolgin (10) Patent No.: US 9,885,777 B2
(45) Date of Patent: Feb. 6, 2018

(54) DETECTION OF STEALTH VEHICLES USING VHF RADAR

(71) Applicant: RAYTHEON COMPANY, Waltham, MA (US)

(72) Inventor: Benjamin Dolgin, Springfield, VA (US)

(73) Assignee: RAYTHEON COMPANY, Waltham, MA (US)

( * ) Notice: Subject to any disclaimer, the term of this patent is extended or adjusted under 35 U.S.C. 154(b) by 493 days.

(21) Appl. No.: 14/592,528

(22) Filed: Jan. 8, 2015

(65) Prior Publication Data

US 2016/0178729 A1    Jun. 23, 2016

Related U.S. Application Data

(60) Provisional application No. 61/925,846, filed on Jan. 10, 2014.

(51) Int. Cl.
*G01S 7/292* (2006.01)
*G01S 7/03* (2006.01)
(Continued)

(52) U.S. Cl.
CPC ............... *G01S 7/03* (2013.01); *G01S 7/292* (2013.01); *G01S 13/42* (2013.01); *G01S 13/48* (2013.01);
(Continued)

(58) Field of Classification Search
CPC . G01S 7/03; G01S 7/292; G01S 13/42; G01S 13/48; G01S 13/5244;
(Continued)

(56) References Cited

U.S. PATENT DOCUMENTS 4,689,627 A * 8/1987 Lee .................. H01P 5/103
333/117
5,250,950 A * 10/1993 Scherrer ............ H01Q 17/00
342/13

(Continued)

OTHER PUBLICATIONS

"Low-frequency Radar", Wikipedia, Jan. 8, 2013, https://web.archive.org/web/20130801060549/https://en.wikipedia.org/wiki/Low-frequency_radar, retrieved Jun. 8, 2017.*

(Continued)

*Primary Examiner* — Peter M Bythrow
(74) *Attorney, Agent, or Firm* — Lewis Roca Rothgerber Christie LLP (57) ABSTRACT

A radar system for detecting stealth vehicles, e.g., stealth aircraft. Relatively long-wavelength very high frequency (VHF) or ultra high frequency (UHF) radar radiation is used to reduce the ability of the stealth vehicle to direct the reflected radar radiation away from the radar receiver. The radar is operated with two or more transmitting beams. The beams are separately modulated and misaligned relative to each other. When the stealth vehicle is nearer to a first beam than to a second beam of the transmitting beams, the vehicle reflects more of the first beam radar radiation, and more of the corresponding modulation, back toward the receiver. The receiver measures the magnitudes of the modulations in the reflected radar radiation and infers, from the difference between these magnitudes, the direction to the stealth vehicle.

20 Claims, 4 Drawing Sheets

(51) Int. Cl.
 *G01S 13/42* (2006.01)
 *G01S 13/48* (2006.01)
 *G01S 13/02* (2006.01)
(52) U.S. Cl.
 CPC . *G01S 2013/029* (2013.01); *G01S 2013/0254* (2013.01)
(58) Field of Classification Search
 CPC ..... G01S 2013/0245; G01S 2013/0254; G01S 2013/029
 USPC .................................................... 342/13, 157
 See application file for complete search history.

(56) References Cited

U.S. PATENT DOCUMENTS

| | | | | |
|---|---|---|---|---|
| 5,262,781 | A * | 11/1993 | Evans | G01S 13/9035 342/165 |
| 5,990,822 | A * | 11/1999 | Honigsbaum | G01S 13/003 342/13 |
| 6,867,726 | B1 * | 3/2005 | Yu | G01S 7/2813 342/149 |
| 7,019,681 | B1 * | 3/2006 | Pellett | G01S 7/41 342/128 |
| 7,629,921 | B1 * | 12/2009 | Manry | G01S 13/89 342/179 |
| 2005/0033488 | A1 * | 2/2005 | Wittenberg | G01S 5/0284 701/3 |
| 2013/0016001 | A1 * | 1/2013 | Schoeberl | G01S 7/03 342/129 |
| 2014/0111372 | A1 * | 4/2014 | Wu | G01S 7/418 342/146 |
| 2014/0253365 | A1 * | 9/2014 | Kirsch | G01S 13/58 342/112 |

OTHER PUBLICATIONS

Russian / PLA Low Band Surveillance Radars (Counter Low Observable Technology Radars) Technical Report APA-TR-2007-0901, Dr Carlo Kopp, AFAIAA, SMIEEE, Peng, Updated Apr. 2012, http://www.ausairpower.net/APA-Rus-Low-Band-Radars.html, retrieved Jun. 8, 2017.*
Passive and Low-Frequency Radar: Theory in Detection of Stealth Aircraft, Lt T.J. Thornton, 4 AD Regt RCA, http://canadianartillery.ca/wp-content/uploads/2011/04/9-Passive-and-Low-Frequency-Radar.pdf, retrieved Jun. 8, 2017.*
http://en.wikipedia.org/wiki/Lorenz_beam, 5 pages, Dec. 31, 2014.

* cited by examiner

DETECTION OF STEALTH VEHICLES USING VHF RADAR

CROSS-REFERENCE TO RELATED APPLICATION(S)

The present application claims priority to and the benefit of U.S. Provisional Application No. 61/925,846, filed Jan. 10, 2014, entitled "DETECTION OF STEALTH VEHICLES USING VHF RADAR", the entire content of which is incorporated herein by reference.

BACKGROUND

1. Field

One or more aspects of embodiments according to the present invention relate to radar systems and more particularly to a system and method for detecting stealth vehicles using long-wavelength radar.

2. Description of Related Art

Stealth vehicles are vehicles that are less readily detected than other vehicles, using conventional radar. A stealth vehicle may be difficult to detect because it may reflect incident radar radiation in directions away from the radar receiver. A stealth vehicle may have this property only for short wavelength radar radiation, e.g., radar radiation that is significantly shorter than the dimensions of the vehicle. A stealth aircraft, for example, may be able to reflect incident radar radiation in directions away from the radar receiver if the wavelength of the radiation is much shorter than the wingspan of the aircraft. Radar radiation from a radar system employing longer wavelength radiation may reflect from the stealth vehicle into a broad range of angles, including, for example, the direction to the radar receiver. The angular resolution of a conventional radar system employing long-wavelength radiation may be poor unless it employs a very large transmitting antenna or a very large receiving antenna, or both.

Thus, there is a need for a radar system capable of detecting stealth vehicles, with good angular resolution.

SUMMARY

Aspects of embodiments of the present invention are directed toward a radar system for detecting stealth vehicles, e.g., stealth aircraft. Relatively long-wavelength high frequency (HF), very high frequency (VHF), or ultra high frequency (UHF) radar radiation is used to reduce the ability of the stealth vehicle to direct the reflected radar radiation away from the radar receiver. The radar is operated with two or more transmitting beams. The beams are separately modulated and misaligned relative to each other. When the stealth vehicle is nearer to a first beam than to a second beam of the transmitting beams, the vehicle reflects more of the first beam radar radiation, and more of the corresponding modulation, back toward the receiver. The receiver measures the magnitudes of the modulations in the reflected radar radiation and infers, from the difference between these magnitudes, the direction to the stealth vehicle.

According to an embodiment of the present invention, there is provided a radar system for detecting an aircraft having a characteristic length, the system including: a transmitter and a receiver, the transmitter being configured to transmit: a first radar beam having: a first wavelength, longer than the characteristic length of the aircraft, a first direction, a first half-power beam width, and a first modulation, and a second radar beam having: a second wavelength, longer than the characteristic length of the aircraft, a second direction, a second half-power beam width, and a second modulation, and the angle between the first direction and the second direction being more than 1% of the average of the first half-power beam width and the second half-power beam width, and the first modulation being different from the second modulation, the receiver being configured to: receive a radar signal resulting from reflections, from the aircraft, of the first radar beam and the second radar beam, measure the magnitude of the first modulation in the received radar signal, and measure the magnitude of the second modulation in the received radar signal.

In one embodiment, the transmitter is further configured to transmit a third radar beam having: a third wavelength, longer than the characteristic length of the aircraft, a third direction, a third half-power beam width, and a third modulation, the angle between the first direction and the third direction being more than 1% of the average of the first half-power beam width and the third half-power beam width, the angle between the second direction and the third direction being more than 1% of the average of the second half-power beam width and the third half-power beam width, and the third modulation being different from the first modulation and from the second modulation, and wherein the receiver is further configured to: receive a radar signal resulting from reflections, from the aircraft, of the first radar beam, the second radar beam, and the third radar beam, and measure the magnitude of the third modulation in the received radar signal.

In one embodiment, at a direction between the first direction and the second direction a radiant intensity of the first radar beam is equal to a radiant intensity of the second radar beam.

In one embodiment, the system includes a steering apparatus configured to steer the transmitter and the receiver.

In one embodiment, the receiver is configured to control the steering apparatus to steer the transmitter and the receiver: in the direction of the first radar beam when the magnitude of the first modulation in the received radar signal exceeds the magnitude of the second modulation in the received radar signal, and in the direction of the second radar beam when the magnitude of the second modulation in the received radar signal exceeds the magnitude of the first modulation in the received radar signal.

In one embodiment, the receiver is configured to control the steering apparatus to steer the transmitter and the receiver to a direction such that the magnitude of the first modulation in the received radar signal equals the magnitude of the second modulation in the received radar signal.

In one embodiment, the receiver includes a first phased array antenna, configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

In one embodiment, the receiving beam has a receiving beam width, the receiving beam width being substantially the same as the first beam width.

In one embodiment, the first phased array antenna is configured to adjust receiving element phases to steer the receiving beam.

In one embodiment, the transmitter includes a second phased array antenna, and the second phased array antenna is configured to adjust transmitting element phases to steer the first radar beam and to steer the second radar beam.

In one embodiment, the receiver is configured to control the first phased array antenna and the second phased array antenna to steer the first radar beam, the second radar beam, and the receiving beam: in the direction of the second radar beam when the magnitude of the first modulation in the received radar signal exceeds the magnitude of the second modulation in the received radar signal, and in the direction of the first radar beam when the magnitude of the second modulation in the received radar signal exceeds the magnitude of the first modulation in the received radar signal.

In one embodiment, the receiver is configured to control the first phased array antenna and the second phased array antenna to steer the first radar beam, the second radar beam, and the receiving beam while maintaining constant the angles between the first radar beam, the second radar beam, and the receiving beam.

In one embodiment, the system includes a phased array antenna configured to operate alternately as: a transmitting phased array antenna, and a receiving phased array antenna, wherein the receiving phased array antenna is configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

In one embodiment, the phased array antenna is configured to adjust transmitting and receiving phases to steer the first radar beam, the second radar beam, and the receiving beam.

In one embodiment, the receiver is configured to control the phased array antenna to steer the first radar beam, the second radar beam, and the receiving beam: in the direction of the first radar beam when the magnitude of the first modulation in the received radar signal exceeds the magnitude of the second modulation in the received radar signal, and in the direction of the second radar beam when the magnitude of the second modulation in the received radar signal exceeds the magnitude of the first modulation in the received radar signal.

In one embodiment, the receiver is configured to control the phased array antenna to steer the first radar beam, the second radar beam, and the receiving beam while maintaining constant the angles between the first radar beam, the second radar beam, and the receiving beam.

According to an embodiment of the present invention, there is provided a method for operating a radar system to detect an aircraft having a characteristic length, the method including: transmitting a first radar beam having: a first wavelength, longer than the characteristic length of the aircraft, a first direction, a first half-power beam width, and a first modulation, and transmitting a second radar beam having: a second wavelength, longer than the characteristic length of the aircraft, a second direction, a second half-power beam width, and a second modulation, receiving a radar signal resulting from reflections, from the aircraft, of the first radar beam and the second radar beam, measuring the magnitude of the first modulation in the received radar signal, and measuring the magnitude of the second modulation in the received radar signal.

In one embodiment, the transmitting of the first radar beam includes transmitting the first radar beam by a first phased array antenna; the transmitting of the second radar beam includes transmitting the second radar beam by a second phased array antenna; and the receiving of the radar signal includes receiving the radar signal by a third phased array antenna.

In one embodiment, the first phased array antenna, the second phased array antenna, and the third phased array antenna are the same phased array antenna.

In one embodiment, the first modulation is on-off modulation, and the second modulation is on-off modulation that is complementary to the first modulation.

DETAILED DESCRIPTION

The detailed description set forth below in connection with the appended drawings is intended as a description of exemplary embodiments of a system and method for detection of stealth vehicles using HF and VHF radar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Stealth vehicles, e.g., stealth aircraft, may be stealthy in the super high frequency (SHF) range as a result of being designed to deflect the short wave radiation of SHF radar in a direction other than towards the incoming radar beam where the receiver may also be positioned. Because very little radiation is reflected back to the radar system, a conventional SHF radar may fail to detect stealth vehicles.

A stealth vehicle's ability to direct reflected radar in directions away from the transmitter is limited, however, to radar radiation with wavelengths much shorter than the size of the vehicle. For example, high frequency (HF), very high frequency (VHF), or ultra high frequency (UHF) radar radiation, with a wavelength roughly double the size of the vehicle, will reflect into a broad range of angles generally including the direction to the radar receiver. Thus, a stealth vehicle illuminated with a VHF or UHF radar beam may generate readily detectable returns. The angular resolution of a conventional VHF or UHF radar is poor, however, unless a large antenna array, e.g., an array with dimensions of several hundred meters, is used.

In one embodiment, a sub-diffraction-limit radar may be used to detect a stealth vehicle and to estimate the direction to the stealth vehicle with good angular resolution. Since the size of the stealth vehicle may be known, the resonant frequencies at which the stealth vehicle reflects in the RF range may be obtained beforehand and the radar tuned to those frequencies. For example, a drone with a wingspan of 20 m may have a resonance between 42 m and 47 m; in this range of frequencies, the aircraft may have an enhanced radar cross section. There may be additional resonant frequencies, related, for example, to the height of the vehicle or to its length. As used herein, a "resonant frequency" of the aircraft is a frequency at which the radar cross section of the aircraft has a local maximum, such that the radar cross section at the resonant frequency is at least three times as great as the radar cross section at a first frequency higher than the resonant frequency, and the radar cross section at the resonant frequency is at least three times as great as the radar cross section at a second frequency lower than the resonant frequency, and there are no other local maxima between the first frequency and the second frequency. As used herein, a "characteristic length" of the aircraft is one-half of the wavelength corresponding to a resonant frequency, i.e., one half of the speed of light times the resonant frequency. In one embodiment, a characteristic length of an aircraft is the wingspan of the aircraft. If the size of the craft is not known, it may be possible for the radar system to perform a real-time frequency scan. In one embodiment, a transmitter of the radar system transmits two misaligned, independently modulated beams at a frequency near a resonant frequency of the aircraft, and a radar receiver measures the magnitude, in the received signal, of the first modulation and of the second modulation, and estimates the direction to the stealth vehicle. An array antenna may be used to transmit the two beams. In one embodiment, three or more beams, each modulated with a respective modulation, are used.

In conventional radar systems, the Rayleigh diffraction limit or "Rayleigh criterion" provides an estimate of the closest angular location of two uncorrelated sources, e.g., uncorrelated sources of electromagnetic radiation, that can be resolved using an ideal detector with a given entrance pupil. For a round pupil the limiting value of this limit is:

$$\sin\vartheta = 1.22\frac{\lambda}{D}$$

Because of the reciprocity of the characteristics of an antenna when transmitting and the characteristics of the antenna when receiving, a transmitted radar beam diameter may be constrained by a similar limit, e.g., the angular beam width may be given approximately by the ratio of the wavelength to the transverse size of the transmitting antenna.

Figure 1:
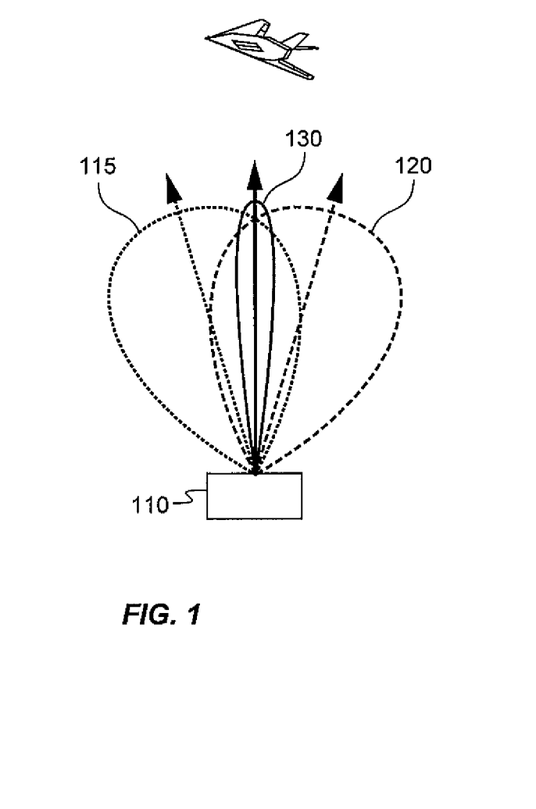
FIG. 1 is an antenna pattern diagram illustrating a first antenna pattern, a second antenna pattern, and an overlap beam, according to an embodiment of the present invention.

If the radar transmitter emits a composite beam including two or more overlapping beams, however, better angular resolution may be achieved, i.e., it may be possible to construct a sub-diffraction-limit radar system. Referring to FIG. 1, in one embodiment, a radar transceiver 110 includes a transmitter that generates a first antenna pattern 115 with a first main lobe or first "beam" and a second antenna pattern 120 with a second main lobe or second beam; the first and second beams are misaligned. Each antenna pattern illustrated in FIG. 1 may be the radiant intensity, i.e., the far-field power per unit solid angle, shown in a polar plot as a function of angle. The antenna patterns illustrated in FIG. 1 are idealized for purposes of illustration and do not include side lobes. The first and second beams overlap, and the range of angles within which the transmitter transmits approximately the same radiant intensity in each of the beams may be referred to as an overlap beam 130. In this embodiment, each of the first beam 115 and the second beam 120 may have a width comparable to the Rayleigh diffraction limit, and, as a result, they may be relatively broad, but the overlap beam 130 may be significantly narrower. Two misaligned beams may be produced, for example, by a reflector dish with two transmitting horns.

In one embodiment, the first beam 115 is modulated with a first modulation, and the second beam 120 is modulated with a second modulation. For example, in a modulation scheme referred to herein as dot-dash modulation, the first modulation is on-off modulation with a duty cycle of less than 50% (i.e., "dots"), and the second modulation is complementary on-off modulation, i.e., on-off modulation with a duty cycle greater than 50%, i.e., "dashes", and with a phase such that the second beam is off whenever the first beam is on, and the second beam is on whenever the first beam is off, so that one of the two beams is on at any time.

A receiver in the radar transceiver may receive radar radiation reflected from a stealth vehicle. A stealth vehicle that is within only the first beam will reflect radar radiation from only the first beam, and a stealth vehicle that is within only the second beam will reflect radar radiation from only the second beam. A stealth vehicle that is within the overlap beam 130 (i.e., a stealth vehicle that is within both the first beam and the second beam) will reflect radar radiation from both transmitted beams, in proportions depending on the stealth vehicle's location within the overlap beam 130. For example, the radar radiation reflected to the receiver by a stealth vehicle that is nearer to the center of the first beam than to the center of the second beam may contain a greater proportion of radar radiation of the first beam than of the second beam.

Figure 2A:
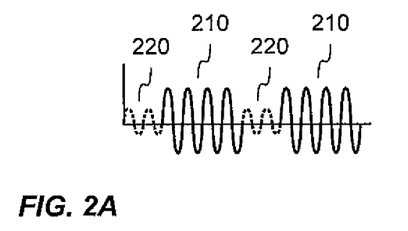
FIG. 2A is a waveform diagram illustrating received reflected radar radiation from a stealth vehicle in a first location, according to an embodiment of the present invention.
Figure 2B:
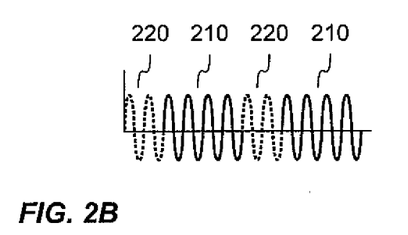
FIG. 2B is a waveform diagram illustrating received reflected radar radiation from a stealth vehicle in a second location, according to an embodiment of the present invention.
Figure 2C:
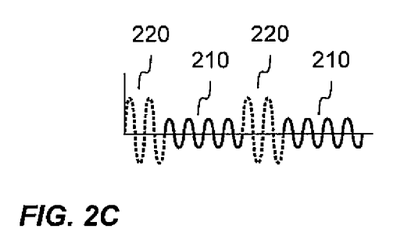
FIG. 2C is a waveform diagram illustrating received reflected radar radiation from a stealth vehicle in a third location, according to an embodiment of the present invention.

Thus the radar radiation reflected from the stealth vehicle may contain two components, a first reflected component that is due to reflection, by the stealth vehicle, of the first beam, and a second reflected component that is due to reflection, by the stealth vehicle, of the second beam; each component carries the corresponding modulation. If the stealth vehicle is in a first location nearer to the center of the second beam than to the center of the first beam, for example, the radar radiation reflected from the stealth vehicle contains the second modulation ("dashes" 210) with a magnitude that is greater than that of the first modulation ("dots" 220), as illustrated in FIG. 2A. If the stealth vehicle is in a second location equally close to the center of the first beam and to the center of the second beam, the radar radiation reflected from the stealth vehicle contains the first modulation and the second modulation, with the same magnitude, as illustrated in FIG. 2B. If the stealth vehicle is in a third location nearer to the center of the first beam than to the center of the second beam, the radar radiation reflected from the stealth vehicle contains the first modulation with a magnitude that is greater than that of the second modulation, as illustrated in FIG. 2C. The receiver is configured to distinguish, in the radar radiation reflected by the stealth vehicle, the first and second modulations, and to infer, from the relative magnitudes of these modulations, the direction to the stealth vehicle. For example, if the magnitude of the second modulation in the radar radiation reflected from the stealth vehicle is slightly larger than the magnitude of the first modulation in the radar radiation reflected from the stealth vehicle, the receiver may infer that the stealth vehicle is within the overlap beam 130, and that the stealth vehicle is offset from the center of the overlap beam 130 by a small angle in the direction of the second beam. In one embodiment, the direction to the stealth vehicle may be measured or estimated with a resolution 1000 times better than the Rayleigh criterion.

The estimated direction to the stealth vehicle, or estimated "target angle", may also be affected by characteristics of the stealth vehicle. A stealth vehicle that has directional reflectivity may introduce an error into the estimated angle, by producing larger or smaller reflections of the second beam relative to the first beam than it would if its reflectivity were omnidirectional. In one embodiment, this error is less than or of order the width of the overlap beam 130.

The system may display the estimated target angle to an operator, or use it for subsequent processing or control, e.g., the system may track the stealth vehicle by continuously steering the transceiver in the direction of the stealth vehicle, determined from the difference between the magnitude of the first modulation in the received radar signal and the magnitude of the second modulation in the received radar signal. This may be accomplished, for example, by steering the transceiver in the direction of the beam producing the stronger reflections. The angle between the center of the overlap beam and the stealth vehicle may be estimated by multiplying this difference by a scaling factor, or the estimated angle may be a different function, e.g., a nonlinear function of this difference. If the stealth vehicle is outside of the overlap beam 130 by a sufficiently large angle that the measured magnitude of one of the modulations is too small, in the received radar radiation, to be distinguished from zero, then the system may discard the measurement, i.e., exclude it from further processing, or the system may steer the antenna gradually toward the stealth vehicle until both modulations have a measured magnitude in the received radar radiation that significantly exceeds zero. The radar system may have a steering apparatus, such as an azimuth-elevation mount, for steering the transmitter and the receiver, or for steering the antennas.

The first and second modulation may be selected to be orthogonal. If each of the beams carries a signal S that is a function of the radar carrier C and a modulation signal M so that $$S=F(C,M)$$

and $$M=F^{-1}(S,C)+\text{error}$$

where F and $F^{-1}$ are modulation and demodulation functions, and if the modulation is linear, then $$F^{-1}(F(C,M_1)+F(C,M_2))=M_1+M_2+\text{error}$$

where error is small.

Orthogonality in the time domain, as used herein, means that $$\int_{t-T}^{t} M_1 \cdot M_2 \cdot dt = 0$$

As mentioned above, the first and second modulation may be dot-dash modulation. In other embodiments, the modulations consist of on-off modulation with two 50% duty cycle modulation waveforms, separated by 180 degrees, or amplitude modulation with square waves or with sine waves separated by 90 degrees, or complementary on-off modulation with a binary code, e.g., a pseudorandom binary code. In yet other embodiments, the first and second modulation may also, or instead, be orthogonal in the frequency domain or space domain, e.g., the modulations may consist of frequency modulation, or spatial modulation (e.g., the directions of the first and second beams may be modulated).

On-off modulation with a binary code may be employed at bit rates up to one-half of the radar carrier frequency. In a pulsed radar system, each pulse may contain a "word" of several bits of the binary code; the word may be sixteen bits in length.

In one embodiment, the receiver employs conventional radar processing to determine the range to the stealth vehicle. For example, if the radar operates in a pulsed mode, the receiver measures the time delay or "round trip delay" between the transmission of the pulse and the reception, at the receiver, of the pulse after reflection from the stealth vehicle. If the radar operates in a continuous wave (CW) mode, the phase difference between the transmitted wave and the received wave is used to estimate the distance to the stealth vehicle, from which the round trip delay may be inferred. Once the round trip delay is known, for the exemplary types of amplitude modulation listed above, the magnitude of a modulation (e.g., the first or second modulation) in the received radar radiation may then be obtained by delaying the modulation by the round trip delay, and correlating the delayed modulation with the received signal. The correlation may be performed by performing a frequency conversion on the received signal, e.g., down-converting the received radar signal to baseband, and then multiplying the frequency-converted signal by the delayed modulation, averaging the product over time, and taking the absolute value. The averaging may be performed over several pulses in a pulsed radar system. In other embodiments, the magnitudes of the first and second modulations may be measured using signal processing at an intermediate frequency (IF) instead of at baseband.

The modulations may not be perfectly orthogonal, e.g., as a result of imperfections in circuitry generating the modulations and applying them to the radar carrier, and the sensitivity of the system may be correspondingly reduced.

The antenna patterns of the first beam and the second beam and the misalignment angle between the first beam and the second beam may be selected or adjusted for good sensitivity in the measurement of the target angle. The sensitivity may be better if each of the first beam and the second beam has a sharp edge (i.e., radiant intensity changing rapidly with angle) within the overlap beam 130, so that the difference between the magnitude of the first modulation and the magnitude of the second modulation in the received beam changes rapidly with target angle. The sensitivity may also be better if both beams have high radiant intensity within the overlap beam 130, so that the radar radiation reflected from the stealth vehicle generates a signal in the receiver that is well above the receiver noise floor. In one embodiment, the misalignment angle is 1% of the beam width, where the beam width or "half-power beam width" is defined as the angle between the directions at which the radiant intensity of the antenna pattern is 3 dB less than (i.e., one-half of) the radiant intensity at the peak of the antenna pattern. The direction of the beam is defined to be the direction corresponding to the peak of the antenna pattern, i.e., the direction in which the antenna pattern has maximum radiant intensity. In another embodiment, the misalignment angle is greater than 1% of the half-power beam width, e.g., approximately one-half of the half-power beam width, as illustrated in FIG. 1. In one embodiment, each antenna pattern is designed to be relatively flat over a range of angles and to drop sharply on one or both sides of the beam.

The antenna pattern of a receiving antenna may have a main lobe referred to as the "receiving beam". The receiving beam has a half-power beam width equal to the angle between the directions at which the output power, at the output of the receiving antenna, for constant incident irradiance (i.e., constant power per unit area), is half of the peak output power. The receiving beam direction is defined as the direction of the peak of the antenna pattern, i.e., the direction in which the output power, for constant incident irradiance, is maximum. The receiving antenna may be aligned so that the receiving beam direction is the center of the overlap beam, so that the system's sensitivity for stealth vehicles in the overlap beam is high as a result of the stealth vehicle being illuminated by both the first beam and the second beam, and as a result of the receiver having relatively high sensitivity in the direction of the overlap beam.

Figure 3:
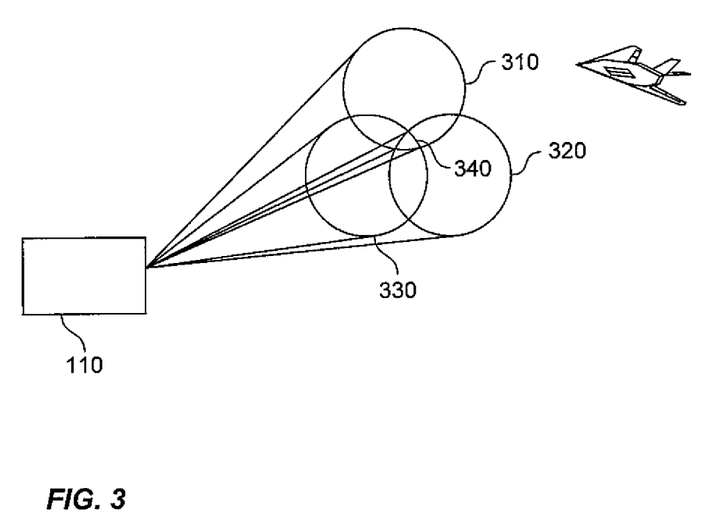
FIG. 3 is a diagram illustrating high-resolution measurement of the direction to a stealth vehicle in bearing and elevation, according to an embodiment of the present invention.

Referring to FIG. 3, in one embodiment, a third beam 310 is employed to enable the system to measure two angles, e.g., bearing or "azimuth", and elevation. For example, the second beam 320 may be slightly misaligned in azimuth or bearing from the first beam 330, and the third beam 310 may be slightly misaligned in elevation from the first beam 330. In other embodiments, the misalignments may be other combinations of azimuth and elevation misalignments. In such a system, three modulations may be applied to the three beams, and the three modulations may be mutually orthogonal. In one embodiment, the modulation in each beam is on-off modulation with a duty cycle of ⅓, and the three modulations are offset in phase by 120 degrees. In other embodiments, more than three separately modulated beams may be used; for example, four beams may be used, with a second beam misaligned from a first beam in elevation, and a third and a fourth beam misaligned from the first beam in both elevation and azimuth, so that, e.g., the four directions of the four beams form a diamond or a square on the surface of a unit sphere.

Each of the transmitted beams may be produced by a separate antenna, and another separate antenna may be used as the receiving antenna, or two or more of these antennas may have shared elements. For example, as mentioned above, a single dish reflector may have two or more transmitting horns; such a dish reflector may also have a receiving horn.

Figure 4:
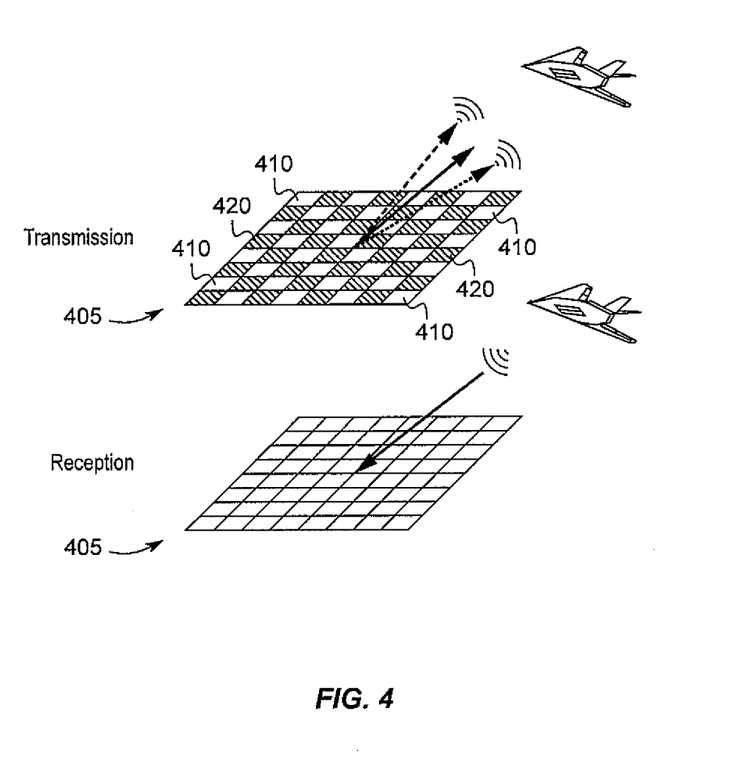
FIG. 4 is a diagram illustrating the operation of a phased array antenna to transmit two beams from subarrays of the antenna, according to an embodiment of the present invention.

Referring to FIG. 4, one or more phased array antennas 405 may be used to build a system according to embodiments of the present invention. As used herein, a phased array antenna is a transmitting or receiving system that includes two or more transmitting or receiving array elements that are driven with, or configured to receive, coherent signals. A phased array antenna may consist of an array of elements connected with a splitter/combiner network, or it may include additional components such as power amplifiers, low-noise amplifiers, active gain and phase control circuits, and digital circuits for controlling gain and phase control circuits. A square phased array antenna may be used for transmitting, for example, with a first subarray transmitting the first beam and a second subarray transmitting the second beam. The first subarray may consist of some, e.g., half, of the elements, and the second subarray may consist of the remaining array elements. In one embodiment, the elements 410 of the first subarray include every other element in each row and every other element in each column, so that the elements of the first subarray and the elements 420 of the second subarray form a checkered pattern on the array. Each of the transmitting subarrays may be driven with phasing that causes it to radiate a beam with a width near the Rayleigh diffraction limit, and the phasing of the subarrays may differ in a manner that causes the transmitted beams to be misaligned. If a phased array antenna is used, then instead of employing a steering apparatus to steer the beams, the phasing of the elements may be adjusted in real time to steer the beams, e.g., in the direction of the stealth vehicle, while maintaining the angles between the beams fixed or constant.

The receiving array may be the same array or it may be a separate array, with phasing such that the receiving antenna pattern includes the overlap beam 130. More than two beams may be transmitted with a phased array antenna, e.g., by dividing the phased array into more than two subarrays. Thus, the transmitter and receiver of the radar system may share some components, such as a phased array antenna, or, for example, a dish reflector used by both transmitting and receiving horns.

The amplitude of the reflected signal from a small object in conventional and sub-diffraction-limit radar may be comparable, and the detection range for small objects in sub-diffraction-limit radar may be comparable to or slightly less than that of conventional radar.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the teens "use", "using", and "used" may be considered synonymous with the terms "utilize", "utilizing", and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a system and method for detection of stealth vehicles using VHF radar have been specifically described and illustrated herein, many modifications and variations will be apparent to those skilled in the art. For example, although embodiments of the present invention are described herein with reference to VHF radar, the invention may be practiced with HF or UHF radar. Accordingly, it is to be understood that a system and method for detection of stealth vehicles using VHF radar employed according to principles of this invention may be embodied other than as specifically described herein. The invention is also defined in the following claims, and equivalents thereof.

What is claimed is:

1. A radar system for detecting an aircraft having a characteristic length, the system comprising:
   a transmitter and a receiver,
   the transmitter being configured to transmit:
      a first radar beam having:
         a first wavelength, longer than the characteristic length of the aircraft,
         a first direction,
         a first half-power beam width, and
         a first modulation, and
      a second radar beam having:
         a second wavelength, longer than the characteristic length of the aircraft,
         a second direction,
         a second half-power beam width, and
         a second modulation, and
      the angle between the first direction and the second direction being more than 1% of the average of the first half-power beam width and the second half-power beam width, and the first modulation being different from the second modulation,
   the receiver being configured to:
      receive a radar signal resulting from reflections, from the aircraft, of the first radar beam and the second radar beam,
      measure the magnitude of the first modulation in the received radar signal, and
      measure the magnitude of the second modulation in the received radar signal.

2. The system of claim 1, wherein the transmitter is further configured to transmit
   a third radar beam having:
      a third wavelength, longer than the characteristic length of the aircraft,
      a third direction,
      a third half-power beam width, and
      a third modulation,
   the angle between the first direction and the third direction being more than 1% of the average of the first half-power beam width and the third half-power beam width,
   the angle between the second direction and the third direction being more than 1% of the average of the second half-power beam width and the third half-power beam width, and
   the third modulation being different from the first modulation and from the second modulation,
   and wherein the receiver is further configured to:
   receive a radar signal resulting from reflections, from the aircraft, of the first radar beam, the second radar beam, and the third radar beam, and
   measure the magnitude of the third modulation in the received radar signal.

3. The system of claim 1, wherein at a direction between the first direction and the second direction a radiant intensity of the first radar beam is equal to a radiant intensity of the second radar beam.

4. The system of claim 1, further comprising a steering apparatus configured to steer the transmitter and the receiver.

5. The system of claim 4, wherein the receiver is configured to control the steering apparatus to steer the transmitter and the receiver:
   in the direction of the first radar beam when the magnitude of the first modulation in the received radar signal exceeds the magnitude of the second modulation in the received radar signal, and
   in the direction of the second radar beam when the magnitude of the second modulation in the received radar signal exceeds the magnitude of the first modulation in the received radar signal.

6. The system of claim 4, wherein the receiver is configured to control the steering apparatus to steer the transmitter and the receiver to a direction such that the magnitude of the first modulation in the received radar signal equals the magnitude of the second modulation in the received radar signal.

7. The system of claim 1, wherein the receiver comprises a first phased array antenna, configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

8. The system of claim 7, wherein the receiving beam has a receiving beam width, the receiving beam width being substantially the same as the first beam width.

9. The system of claim 7, wherein the first phased array antenna is configured to adjust receiving element phases to steer the receiving beam.

10. The system of claim 9, wherein the transmitter comprises a second phased array antenna, and the second phased array antenna is configured to adjust transmitting element phases to steer the first radar beam and to steer the second radar beam.

11. The system of claim 10, wherein the receiver is configured to control the first phased array antenna and the second phased array antenna to steer the first radar beam, the second radar beam, and the receiving beam:
   in the direction of the second radar beam when the magnitude of the first modulation in the received radar signal exceeds the magnitude of the second modulation in the received radar signal, and
   in the direction of the first radar beam when the magnitude of the second modulation in the received radar signal exceeds the magnitude of the first modulation in the received radar signal.

12. The system of claim 11, wherein the receiver is configured to control the first phased array antenna and the second phased array antenna to steer the first radar beam, the second radar beam, and the receiving beam while maintaining constant the angles between the first radar beam, the second radar beam, and the receiving beam.

13. The system of claim 1, further comprising a phased array antenna configured to operate alternately as:
   a transmitting phased array antenna of the transmitter, and
   a receiving phased array antenna of the receiver,
   wherein the receiving phased array antenna is configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

14. The system of claim 13, wherein the phased array antenna is configured to adjust transmitting and receiving phases to steer the first radar beam, the second radar beam, and the receiving beam.

15. The system of claim 14, wherein the receiver is configured to control the phased array antenna to steer the first radar beam, the second radar beam, and the receiving beam:
   in the direction of the first radar beam when the magnitude of the first modulation in the received radar signal exceeds the magnitude of the second modulation in the received radar signal, and
   in the direction of the second radar beam when the magnitude of the second modulation in the received radar signal exceeds the magnitude of the first modulation in the received radar signal.

16. The system of claim 15, wherein the receiver is configured to control the phased array antenna to steer the first radar beam, the second radar beam, and the receiving beam while maintaining constant the angles between the first radar beam, the second radar beam, and the receiving beam.

17. A method for operating a radar system to detect an aircraft having a characteristic length, the method comprising:
   transmitting a first radar beam having:
      a first wavelength, longer than the characteristic length of the aircraft,
      a first direction,
      a first half-power beam width, and
      a first modulation, and
   transmitting a second radar beam having:
      a second wavelength, longer than the characteristic length of the aircraft,
      a second direction,
      a second half-power beam width, and
      a second modulation,
   receiving a radar signal resulting from reflections, from the aircraft, of the first radar beam and the second radar beam,
      measuring the magnitude of the first modulation in the received radar signal, and
      measuring the magnitude of the second modulation in the received radar signal.

18. The method of claim 17, wherein:
   the transmitting of the first radar beam comprises transmitting the first radar beam by a first phased array antenna;
   the transmitting of the second radar beam comprises transmitting the second radar beam by a second phased array antenna; and
   the receiving of the radar signal comprises receiving the radar signal by a third phased array antenna.

19. The method of claim 18, wherein the first phased array antenna, the second phased array antenna, and the third phased array antenna are the same phased array antenna.

20. The method of claim 17, wherein the first modulation is on-off modulation, and the second modulation is on-off modulation that is complementary to the first modulation.

* * * * *